United States Patent [19]
Bosio

[11] Patent Number: 5,320,129
[45] Date of Patent: Jun. 14, 1994

[54] SUPPLEMENTAL BOTTOM FOR A SINGLE-CONTROL WATER MIXER CARTRIDGE

[75] Inventor: Orlando Bosio, Casaloldo, Italy

[73] Assignee: Amfag S.r.l., Castelgoffredo, Italy

[21] Appl. No.: 56,632

[22] Filed: May 4, 1993

[30] Foreign Application Priority Data

May 14, 1992 [IT] Italy .................. MN92A000013

[51] Int. Cl.$^5$ ............................................. F16K 11/074
[52] U.S. Cl. .............................. 137/269; 137/625.17; 137/625.4
[58] Field of Search ............... 137/269, 625.17, 625.4, 137/625.41

[56] References Cited

U.S. PATENT DOCUMENTS

| | | | |
|---|---|---|---|
| 4,621,659 | 11/1986 | Pawelzik et al. | 137/625.4 X |
| 4,804,011 | 2/1989 | Knapp | 137/625.4 X |
| 4,856,556 | 8/1989 | Mennigman | 137/625.4 |
| 4,971,113 | 11/1990 | Pawelzik et al. | 137/625.4 X |
| 4,995,419 | 2/1991 | Pawelzik et al. | 137/625.4 X |
| 4,997,005 | 3/1991 | Pawelzik et al. | 137/625.4 X |
| 5,080,134 | 1/1992 | Orlandi | 137/625.4 X |
| 5,111,842 | 5/1992 | Knapp | 137/625.17 X |

FOREIGN PATENT DOCUMENTS

| | | |
|---|---|---|
| 8507823 | 10/1986 | Fed. Rep. of Germany . |
| 9101627 | 5/1991 | Fed. Rep. of Germany . |
| 670687 | 6/1989 | Switzerland . |
| 2211585 | 7/1989 | United Kingdom . |

Primary Examiner—John Rivell
Attorney, Agent, or Firm—Guido Modiano; Albert Josif; Daniel O'Bryne

[57] ABSTRACT

Supplemental bottom for a single-control mixer cartridge for hot and cold water in a type of faucet particularly suitable for wash-bowls or bidets, including a disk provided with holes at the openings formed in the bottom of the cartridge and with a peripheral gasket, connection teeth to associate with coupling holes provided in the bottom of the cartridge, and ducts for connecting the holes provided in the disk so as to match the openings for the separate inflow of hot and cold water, which are present in the bottom of the cartridge, to the water inflow holes which are present at the base of the cavity for accommodating the cartridge in the faucet.

21 Claims, 2 Drawing Sheets

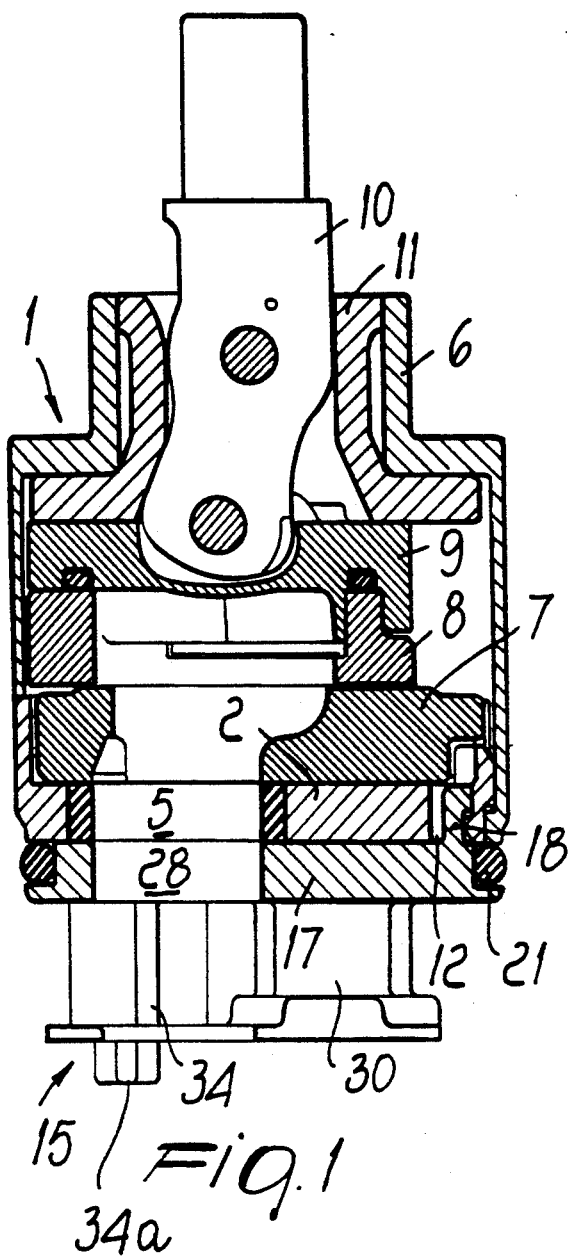
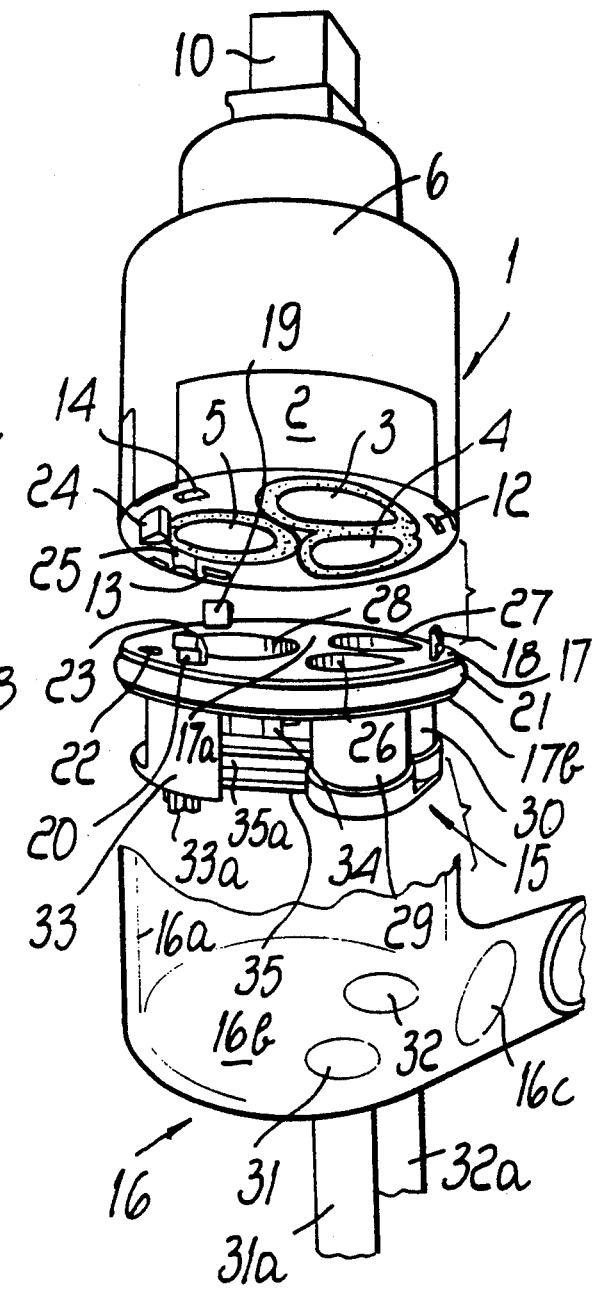
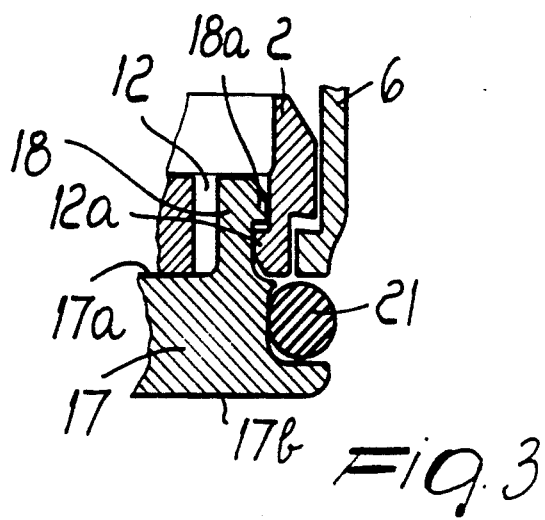
Fig. 1
Fig. 2
Fig. 3

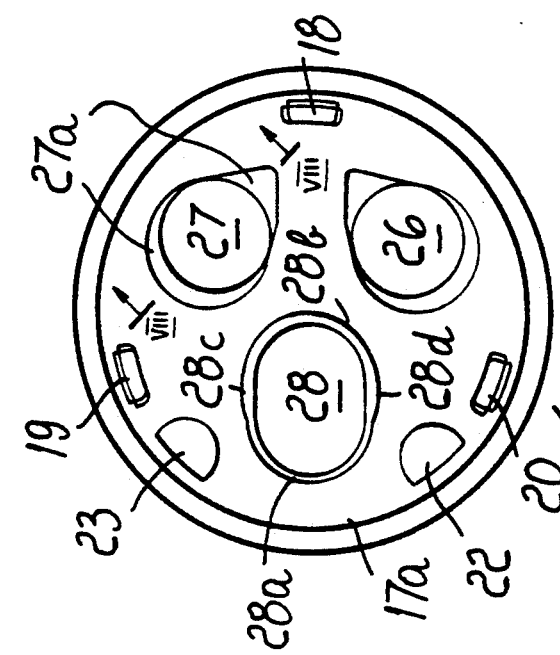
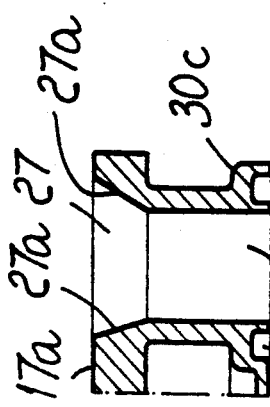
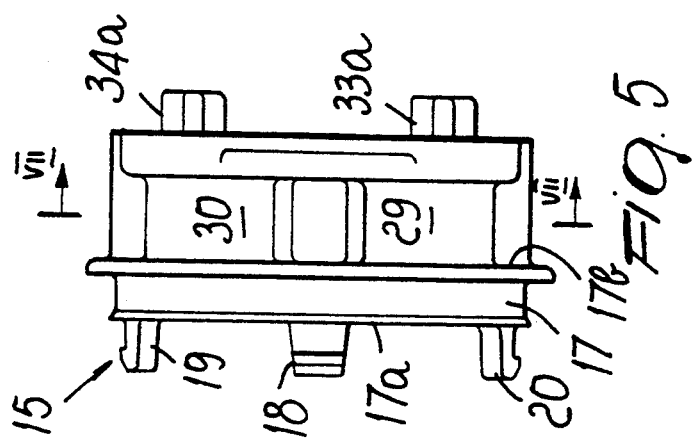
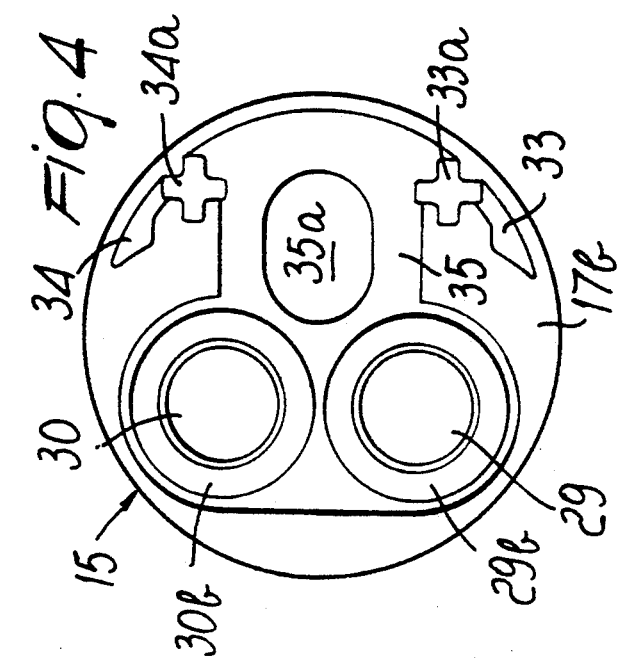
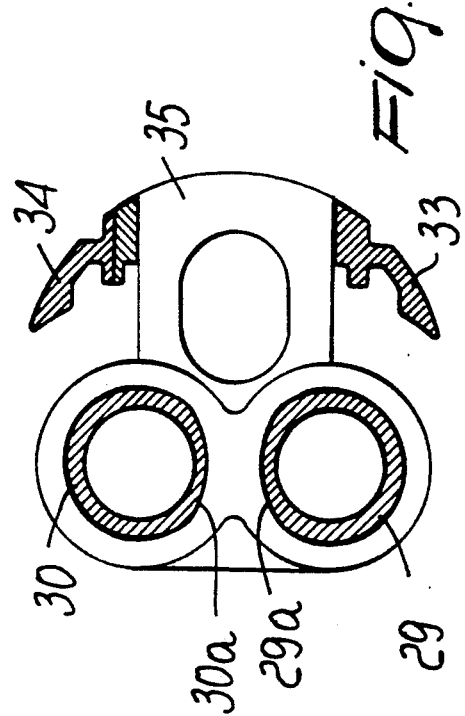

SUPPLEMENTAL BOTTOM FOR A SINGLE-CONTROL WATER MIXER CARTRIDGE

BACKGROUND OF THE INVENTION

The present invention relates to a supplemental bottom for a single-control water mixer cartridge, particularly of the type for mixing hot and cold water in a type of faucet particularly suitable for a wash-bowl or a bidet.

It is known that in the field of faucets there are devices, known as single-control mixer cartridges, which are inserted in faucets and allow, by actuating a single actuation lever, both to vary the flow-rate delivered by the faucet from zero to a maximum value and to vary the temperature of the water by appropriately mixing the hot and cold water reaching the faucet.

In particular, there are cartridges shaped so as to fit in faucets for wash-bowls or bidets, in which a cartridge accommodation cavity is formed; said cavity has a flat base comprising inlet holes for the two pipes for supplying hot and cold water respectively, and has a side wall provided with an outlet hole for the hot, cold or mixed water; these cartridges have the disadvantage that they cannot adapt optimally to faucets of different types, such as very common flush-mount faucets for bath-tubs or showers.

So-called adapter devices have been proposed in order to adapt cartridges specifically designed for flush-mount faucets to the described faucets for wash-bowls and bidets; said devices are inserted between the cartridge and the base of the accommodation cavity, but they have the disadvantage that they create maintenance problems, since it is difficult to remove them due to the jamming caused by the hardening of gaskets or by lime deposits.

In order to overcome the disadvantages of the prior art, the same Applicant has devised a cartridge, as shown in Italian Patent Application No. MN92A000010, which comprises a bottom which is per se suitable for insertion in flushmount faucets for bathtubs and showers but is provided with as to allow to convert said cartridge so that it becomes suitable for optimum insertion in faucets of a different type.

SUMMARY OF THE INVENTION

The aim of the present invention is indeed to provide a supplemental bottom for a single-control mixer cartridge for hot and cold water suitable to allow the optimum insertion of the cartridge in faucets of a suitable type, particularly but not exclusively for wash-bowls or bidets.

This aim is achieved by a supplemental bottom for a single-control mixer cartridge for hot and cold water in a type of faucet particularly suitable for wash-bowls or bidets, according to the present invention, said cartridge being insertable in an accommodation cavity formed within the faucet and comprising a substantially flat bottom provided with openings for the separate inflow of hot and cold water and with an opening for the outflow of hot, cold or mixed water, also provided with means for the stable coupling of a supplemental bottom, characterized in that it comprises a disk provided with holes at said openings formed in the bottom of the cartridge and with a peripheral gasket suitable to make contact with the lateral wall of said accommodation cavity, said disk being provided with two flat faces, the first face being suitable to arrange itself so that it faces said bottom of the cartridge and being provided with means suitable to associate with the means for the stable coupling of the supplemental bottom which are provided in the bottom itself, the second face being provided with ducts for connecting the holes provided in the disk so as to match the openings for the separate inflow of hot and cold water, which are present in the bottom of the cartridge, to the holes for the inflow of said hot and cold water, which are present at the base of said cavity for accommodating the cartridge in the faucet.

BRIEF DESCRIPTION OF THE DRAWINGS

Further characteristics and advantages of the present invention will become apparent from the following description of a preferred but not exclusive embodiment thereof, illustrated only by way of non-limitative example in the accompanying drawings, wherein:

FIG. 1 is a sectional view of a mixer cartridge provided with the supplemental bottom according to the present invention;

FIG. 2 is an exploded view of a mixer cartridge with the related supplemental bottom and of a faucet for washbowls or bidets, shown schematically;

FIG. 3 is a detail view of the coupling of the supplemental bottom to the cartridge;

FIG. 4 is a view of the supplemental bottom, taken from the side meant to face the base of the cartridge accommodation cavity;

FIG. 5 is a side view of the supplemental bottom;

FIG. 6 is a view of the supplemental bottom, taken from the side meant to face the bottom of the cartridge;

FIG. 7 is a sectional view, taken along the plane VII—VII of FIG. 5;

FIG. 8 is a sectional view, taken along the plane VIII—VIII of FIG. 6.

DESCRIPTION OF THE PREFERRED EMBODIMENTS

With reference to the above figures, the reference numeral 1 generally designates a mixer cartridge of the type disclosed in Italian Patent Application MN92A000010 incorporated herein by reference.

Said cartridge comprises the bottom 2 provided with the openings 3 and 4 for the separate inflow of hot and cold water and with the opening 5 for the outflow of hot, cold or mixed water, all of which have associated gaskets; a body 6 is associated with said bottom so as to delimit a portion of space containing a fixed plate 7, made of ceramic material and provided with holes which correspond to the openings of the bottom, and a movable plate 8, also made of ceramic material, which internally forms a mixing chamber and is associated, with a plate cover 9 interposed, with an actuation lever 10, which is pivoted on a rotatable connector 11; in this manner the movable plate can assume different positions with respect to the fixed plate, and it is well-known that by moving the lever about its fulcrum one changes the flow-rate of the water, whereas by turning the connector one varies the temperature of said water.

The described cartridge 1 is optimally suitable for being inserted in flush-mount faucets for bath-tubs and showers, but a main characteristic of said cartridge resides in the fact that it is provided, at the bottom 2, with slots 12, 13 and 14 provided with a tooth, such as 12a for the opening 12 (FIG. 3); said slots constitute stable coupling means for a supplemental bottom, such as the one generally designated by the reference numeral 15, which is the subject of the present invention and is suitable to allow the optimum insertion of the cartridge in a faucet, such as 16, of a type suitable for wash-bowls or bidets.

In other words, it is sufficient to stably engage, in the manner described hereafter, the supplemental bottom 15 with the cartridge 1 in order to obtain the converted cartridge shown in the cross-section of FIG. 1, which is suitable for insertion in said faucet 16 for wash-bowls or bidets.

Moving on to describe the supplemental bottom 15 in detail, it can be seen that it comprises the disk 17 having two flat faces 17a and 17b, from the first of which the three legs 18, 19 and 20 extend; said legs are provided with teeth, such as 18a for the leg 18 suitable to respectively enter the slots 12, 13 and 14 of the bottom of the cartridge for a stable snap-action engagement provided by the teeth such as 12a with the teeth such as 18a.

The disk 17 is provided with a peripheral gasket 21, the cavity for accommodation in the faucet 16, and is provided with cavities 22 and 23 for accommodating respectively the registration pins 24 and 25 extending from the bottom of the cartridge 1; said cavities have a side wall which is shaped complementary, along its entire extension, with respect to the side wall of said pins, and are separated from the edge of the disk by means of thin walls.

The disk 17 is provided with holes 26 and 27 at the openings 3 and 4 for the separate inflow of hot and cold water which are present on the bottom 2 of the cartridge, and is provided with a hole 28 at the opening 5 which is present in said bottom 2 for the outflow of hot, cold or mixed water.

In particular, the holes 26 and 27 have, at the surface 17a, a teardrop cross-section which is clearly visible in FIG. 6 and is shaped complementarily with respect to the internal perimeter of the gaskets of the openings 3 and 4, which are shaped as disclosed in Italian Patent Application MN92A000010, and the hole 28 has a constant cross-section with a perimeter which duplicates the perimeter of the gasket of the opening 5 and is shaped so as to form two circular arcs 28a, 28b joined by two other circular arcs 28c, 28d, as described in the above mentioned patent application.

Ducts 29 and 30 extend from the face 17b of the disk 17 and connect the holes 26 and 27, provided in the disk 17, to the holes 31 and 32 for the inflow of hot and cold water from the tubes 31a and 32a located at the base 16b of the cavity for accommodating the cartridge in the faucet 16; one should furthermore observe the blending, by means of continuous surfaces such as 27a formed in the thickness of the disk, between the inlet section of the holes 26 and 27 and said ducts 29 and 30. One should also note that the connecting ducts 29 and 30 have thin walls which are even thinner in the regions or reduced-thickness wall portions 29a and 30a and, in order to obtain grooves 29b and 30b for containing sealing gaskets not shown in the figure, they are provided with an enlarged base such as 30c.

Flaps 33 and 34 also extend from said face 17b of the disk 17, and are provided, at their ends, with registration pins 33a and 34a suitable to enter holes, not shown in the figure, which are present in a known manner in the base 16b of the accommodation cavity in the faucet 16; said flaps are connected to the ducts 29 and 30 by means of the strengthening plate 35 provided with a hole 35a.

When the cartridge converted with the stable coupling of the supplemental bottom 15, and thus in the condition shown in FIG. 1, is inserted in the seat of the known faucet 16 for wash-bowls or bidets, the plate 35 substantially rests on the bottom 16b of the accommodation cavity, and continuity is thus produced between the tubes 31a and 32a for the inflow of hot and cold water and respectively the conveyance ducts 29 and 30 which convey said water to the openings 3 and 4 for inflow into the cartridge; said continuity is ensured by the gaskets, not shown in the figure, which are inserted in the grooves 29b and 30b.

The hot, cold or mixed water flowing out of the opening 5 present in the bottom of the cartridge enters the hole 28 of the disk 17 to flow into the portion of space delimited in the cartridge accommodation cavity by the wall portion 16a located below the gasket 21 and by the bottom 16b, and to flow toward the opening 16c for flowing out of the faucet, encountering a path which is sufficiently wide and uniform by virtue of the shape of the flaps 33 and 34 and by virtue of the minimization of the bulk of the connecting ducts 29 and 30.

When it is necessary to extract the cartridge from the faucet for maintenance or replacement, the stability of the connection between the bottom 2 and the supplemental bottom ensures the simultaneous extraction of said supplemental bottom as well, totally freeing the accommodation cavity within the faucet.

The described advantageous functional characteristics of the supplemental bottom according to the present invention are not unrelated to other advantageous characteristics regarding both construction and distribution, due to the possibility, allowed by said supplemental bottom, of constituting satisfactorily flexible stores with a modest economical commitment.

The described invention is susceptible to numerous modifications and variations, all of which are within the scope of the inventive concept; thus, for example, the means suitable to associate with the means for stable coupling present in the bottom of the cartridge may assume any configuration; in particular, the number of legs may be different from the one described, depending on the number of slots provided in said bottom.

I claim:

1. Supplemental bottom (15) for single-control mixer cartridge for hot and cold water in a type of faucet particularly suitable for wash-bowls or bidets, said cartridge (1) being insertable in an accommodation cavity formed within the faucet and comprising a substantially flat bottom (2) provided with openings (3,4) for the separate inflow of hot and cold water and with an opening (5) for the outflow of hot, cold or mixed water, said flat bottom being provided with means (12-14) for the stable coupling of a supplemental bottom, the supplemental bottom comprising a disk (17) provided with holes (26-28) for arrangement at said openings formed in the bottom of the cartridge and with a peripheral gasket (21) suitable to make contact with the lateral wall (16a) of said accommodation cavity, said disk being provided with two flat faces (17a, 17b), the first face being arrangeable so that it faces said bottom of the cartridge and being provided with means (18-20) suitable to associate with the means for the stable coupling of the supplemental bottom which are provided in the bottom itself, the second face being provided with ducts (29,30) for connecting the holes provided in the disk so as to match the openings for the separate inflow of hot and cold water, which are present in the bottom of the cartridge, to the holes for the inflow of said hot and cold water, which are present at the base (16b) of said cavity for accommodating the cartridge in the faucet, said cartridge comprising a bottom provided with means for the stable coupling of a supplemental bottom which comprise a plurality of slots (12-14) which pass through the thickness of the bottom and are provided with a tooth (12a) in an intermediate region of said thickness, characterized in that the means suitable to associate with said stable coupling means provided int he bottom of the cartridge comprise a plurality of legs (18-20) extending from the face of the disk which is arrangeable facing the bottom of the cartridge, each leg being suitable to enter one of said slots and being provided with a tooth (18a) which is suitable to associate, by snap action, with the tooth provided in said slots.

2. Supplemental bottom for mixing cartridge according to claim 1, said cartridge being provided with a bottom having openings for the separate inflow of hot and cold water, said openings being provided with gaskets in which the perimeter of the internal surface is teardrop-shaped, wherein the holes of the disk at said openings have, on the face of the disk which faces said bottom of the cartridge, a teardrop cross-section which is complementary to the internal perimeter of said gaskets, said cross-section being blended, by means of continuous surfaces formed in the thickness of the disk, with the ducts for connection to the holes provided in the base of the accommodation cavity.

3. Supplemental bottom for mixer cartridge according to claim 1, said cartridge comprising a bottom having an outlet opening for hot, cold or mixed water provided with a gasket in which the perimeter of the internal surface is shaped so as to form two opposite circular arcs joined by two further circular arcs, wherein the hole of the disk at said opening has a cross-section the perimeter whereof duplicates the internal perimeter of said gasket.

4. Supplemental bottom according to claim 1, wherein the connecting ducts have a thin wall and a base which is wider at the end suitable to be directed towards the base of the accommodation cavity, so as to allow the insertion of a sealing gasket.

5. Supplemental bottom according to claim 1, wherein two flaps extend from the second flat face of the disk and are provided, at their ends, with registration pins suitable to enter holes provided at the base of the cartridge accommodation cavity, said flaps being connected to the connecting ducts by means of a strengthening plate.

6. Supplemental bottom according to claim 5, wherein said strengthening plate is provided with a hole at the hole provided in the disk for the outflow of hot, cold or mixed water.

7. Supplemental bottom (15) for installing a single-control mixer cartridge for hot and cold water in a faucet for wash-bowls or bidets, said cartridge (1) being insertable in an accommodation cavity formed within a faucet and comprising a lateral wall (16a), a substantially flat bottom (2) provided with separate inflow openings (3,4) for hot and cold water and with an outflow opening (5) for hot, cold or mixed water, said flat bottom being provided with coupling means (12-14) for engaging a supplemental bottom, said supplemental bottom comprising a disk (17) provided with holes (26-28) locatable at said inflow openings (3, 4) and said outflow opening (5) and having a peripheral gasket (21) for contacting said lateral wall (16a) of said accommodation cavity, said disk being provided with two flat faces (17a,17b), one of said faces (17a) being arrangeable facing the bottom of said cartridge and provided with means (18-20) engageable with said coupling means (12-14) provided in said flat bottom (2), another one of said faces (17b) having ducts (29,30) protruding perpendicularly therefrom for connecting two of said holes (26, 27), provided in said disk (17) and matching said separate inflow openings (3,4) for hot and cold water formed in said cartridge, to holes (31, 32) for inflow of hot and cold water provided in a base (16b) of a cavity for accommodating said cartridge (1) in a faucet.

8. A supplemental bottom (15) for installing, in washbowls or bidets, a single-control mixer cartridge for a flush-mount faucets for bath-tubs or showers, said supplemental bottom comprising;

a disk (17) having a first face (17a) and an opposite face (17b);

a peripheral sealing gasket (21) extending around said disk (17) for sealed engaging a mixer cartridge cavity formed in a faucet;

engagement members (18, 19, 20) formed integrally with said disk (17) and extending substantially perpendicularly from said first face (17a) for engaging a mixer cartridge;

at least two inflow holes (26, 27) formed in said disk (17) for conveying inflowing hot and cold water;

an outflow hole (28) formed in said disk (17) for conveying outflowing hot, cold or mixed water, and;

at least two ducts (29, 30) extending substantially perpendicularly from said opposite face (17b) of said disk (17) for connecting said inflow holes (26, 27) to hot and cold water supplies in a mixer cartridge cavity formed in a faucet.

9. Supplemental bottom according to claim 8, wherein said inflow holes (26, 27) each define a teardrop-shaped inlet section at said first face (17a) of said disk (17), and wherein said outflow hole (28) has a constant cross sectional shape.

10. Supplemental bottom according to claim 9, wherein said disk (17) defines a thickness, said supplemental bottom further comprising continuous surfaces (27a) formed in said thickness of said disk (17) and connecting said teardrop-shaped inlet section of said inflow holes (26, 27) to said ducts (29, 30).

11. Supplemental bottom according to claim 8, wherein said ducts (29, 30) have mutually facing reduced-thickness wall portions (29a, 30a).

12. Supplemental bottom according to claim 8, further comprising at least two flaps (33, 34) extending substantially perpendicularly from said opposite face (17b) of said disk parallel to said ducts (29, 30), a strengthening plate (35) connecting said flaps (33,34) to said ducts (29, 30), and a hole (35a) formed in said strengthening plate opposite said outflow hole (28).

13. Supplemental bottom according to claim 8, wherein said engagement members (18, 19, 20) comprise at least three legs (18, 19, 20), each of said legs defining an engagement tooth (18a) for snap-together engagement with a mixer cartridge.

14. Supplemental bottom according to claim 12, wherein said first face (17a), said opposite face (17b) and said strengthening plate (35) are mutually parallel, and wherein said engagement members (18, 19, 20), said ducts (29, 30) and said flaps (33, 34) are mutually parallel and extend perpendicular with respect to said first face (17a), said opposite face (17b) and said strengthening plate (35).

15. Supplemental bottom according to claim 8, further comprising;
   one cartridge registration pin accommodation seat (22) formed in said first face (17a) of said disk (17) at a portion thereof located between said outflow hole (28) and one (19) of said engagement members (18, 19, 20), and;
   another cartridge registration pin accommodation seat (23) formed in said first face (17a) of said disk (17) at a portion thereof located between said outflow hole (28) and another one (20) of said engagement members (18, 19, 20).

16. A supplemental bottom (15) for installing, in wash-bowls or bidets, a single-control mixer cartridge for a flush-mount faucets for bath-tubs or showers, said supplemental bottom comprising;
   a disk (17) having a first face (17a) and an opposite face 917b);
   a peripheral sealing gasket (21) extending around said disk (17) for sealed engaging a mixer cartridge cavity formed in a faucet;
   engagement members (18, 19, 20) formed integrally with said disk (17) and extending substantially perpendicularly from said first face (17a);
   means (18a) connected to each of said engagement members (18, 19, 20) for engaging a mixer cartridge;
   at least two inflow holes (26, 27) formed in said disk (17) for conveying inflowing hot and cold water;
   an outflow hole (28) formed in said disk (17) for conveying outflowing hot, cold or mixed water;
   at least two ducts (29, 30) extending substantially perpendicularly from said opposite face (17b) of said disk (17) for connecting said inflow holes (26, 27) to hot and cold water supplies in a mixer cartridge cavity formed in a faucet;
   least two flaps (33, 34) extending substantially perpendicularly from said opposite face (17b) of said disk parallel to said ducts (29, 30), and;
   a strengthening plate (35) connecting said flaps (33, 34) to said ducts (29, 30).

17. Supplemental bottom according to claim 16, further comprising a hole (35a) formed in said strengthening plate (35) opposite said outflow hole (28).

18. Supplemental bottom according to claim 16, wherein said inflow holes (26, 27) each define a teardrop-shaped inlet section at said first face (17a) of said disk (17), said disk (17) defining a thickness, said supplemental bottom further comprising continuous surfaces (27a) formed in said thickness of said disk (17) and connecting said teardrop-shaped inlet section of said inflow holes (26, 27) to said ducts (29, 30).

19. Supplemental bottom according to claim 16, wherein said ducts (29, 30) have mutually facing reduced-thickness wall portions (29a, 30a).

20. Supplemental bottom according to claim 16, wherein said engagement members (18, 19, 20) comprise at least three equidistantly spaced legs (18, 19, 20), and wherein said means (18a) connected to each of said engagement members (18, 19, 20) for engaging a mixer cartridge comprise an engagement tooth (18a) for snap-together engagement with a mixer cartridge.

21. Supplemental bottom according to claim 16, wherein said first face (17a), said opposite face (17b) and said strengthening plate (35) are mutually parallel, and wherein said engagement members (18, 19, 20), said ducts (29, 30) and said flaps (33, 34) extend in an perpendicular direction with respect to said first face (17a), said opposite face (17b) and said strengthening plate (35).

* * * * *